Sept. 13, 1966 J. LIPSHUTZ 3,273,096

ROTARY DIFFERENTIAL TRANSFORMER

Filed March 25, 1964

INVENTOR
JOSEPH LIPSHUTZ

BY Edward M. Farrell

ATTORNEY

United States Patent Office 3,273,096
Patented Sept. 13, 1966

3,273,096
ROTARY DIFFERENTIAL TRANSFORMER
Joseph Lipshutz, Philadelphia, Pa., assignor to Schaevitz Engineering, a corporation of New Jersey
Filed Mar. 25, 1964, Ser. No. 354,549
3 Claims. (Cl. 336—30)

This invention relates to differential transformers, and more particularly to novel types of rotary differential transformers.

Differential transformers have been used in a variety of different forms for producing electrical output signals proportional to the displacement of a body. For example, a differential transformer generally includes a movable element member adapted to be moved in accordance with a measured function with the element being disposed between a primary and a pair of secondary windings of the transformer to vary the magnetic coupling therebetween. The movable element is made of ferromagnetic metal and provides a path for magnetic flux linking of the coils. The secondary windings of many conventional differential transformers generally includes a pair of substantially similar coils which are connected to each other in series opposition or bucking relationship.

In the normal operation of differential transformers, the primary winding is generally energized with alternating current, with electrical signals being induced in the two secondary windings.

Because the two secondary windings are connected in series opposition, the two voltages induced in the two windings are opposite in phase and the net output of the transformer is the difference between the voltages induced in the two secondary windings. For one position of the movable element or core, substantially equal and opposite voltages are induced in the two secondary windings, resulting in a substantially net zero output voltage. When the movable element or core is positioned for zero output volts, the transformer may be said to be at the balance point or null position.

When the movable element or core is moved away from the null position, the voltage induced in the secondary winding towards which the core is moved increases, while the voltage induced in the secondary winding away from which the core is moved decreases. These variations in induced voltages are due to the variations in the magnetic flux path between the primary winding and the respective secondary windings caused by the relative movement of the core member. When the core member is thus moved from its null position, a differential output voltage is developed across the output circuit of the transformer. With proper design, the output voltage from the transformer varies linearly with a change in the core position as long as the core is operating within its linear range. Motion of the core member in the opposite direction beyond the null position produces a similar differential voltage across the output circuit of the transformer, but with the phase shifted 180°.

In many cases, it is desirable to utilize differential transformers for measurements of angular displacement of bodies. Heretofore, such measurements were only possible for relatively small angles. The reason for this is that generally only a single pair of secondary windings were involved and the movement of the core element relatively small distances tended to cause the transformer to operate in its non-linear range.

Another problem prevalent in rotary differential transformers used heretofore has been their relatively low sensitivity. Generally, such low sensitivity has made it necessary to utilize stages of amplification and generally add to the size and complexity of systems involving such transformers.

While, it is sometimes true, that greater sensitivity of a movable element may be accomplished through the use of various gearing mechanisms, such mechanisms are themselves subject to inaccuracies and lead to increased cost and complexity in the systems utilizing them.

It is an object of this invention to provide an improved rotary transducer having a relatively wide range of linear operation.

It is an object of this invention to provide an improved rotary differential transformer of relatively high sensitivity.

It is a further object of this invention to provide an improved rotary differential transformer which is symmetrical and which tends to balance out the effects of linear acceleration in a direction transverse to the direction measured.

It is still a further object of this invention to provide an improved rotary differential transformer in which relatively high sensitivity is achieved without the use of gearing mechanisms.

In accordance with the present invention, a rotary differential transformer is provided. A primary winding is disposed about a common axis. A pair of secondary windings, connected in bucking relationship, are magnetically coupled to the primary winding. Each of the secondary windings include a plurality of coils equally spaced from the common axis. Movable conductive coupling means are provided to couple an input signal from the primary winding to the coils of the two secondary windings to produce an output signal corresponding to the degree of angular movement of the coupling means.

Other objects and advantages of the present invention will be apparent and suggest themselves to those skilled in the art, from a reading of the following specification and claims, in conjunction with the accompanying drawing, in which:

In describing the present invention, for purposes of explanation, references to the terms "windings" and "coils" shall be made. The term winding shall be defined as including one or a number of individual coils, which may be connected in series. A coil shall be defined for purposes of explanation as being a portion of one winding, with a plurality of such coils constituting a winding.

Figure 1:
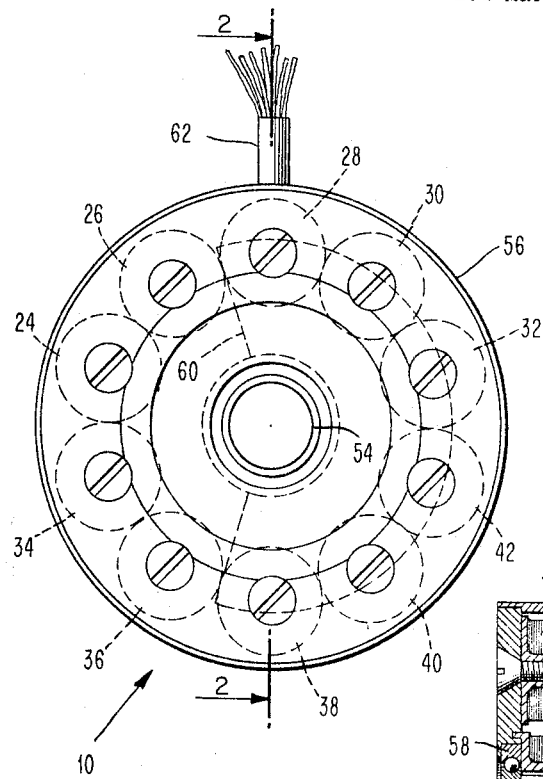
FIGURE 1 is a view of a differential transformer, in accordance with the present invention.
Figure 2:
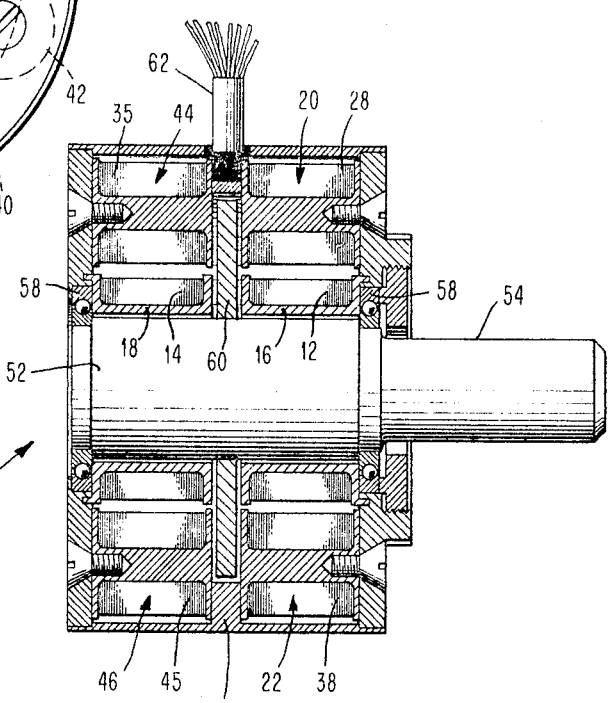
FIGURE 2 is a cross sectional view of the differential transformer of FIGURE 1, taken along lines 2—2.
Figure 3:
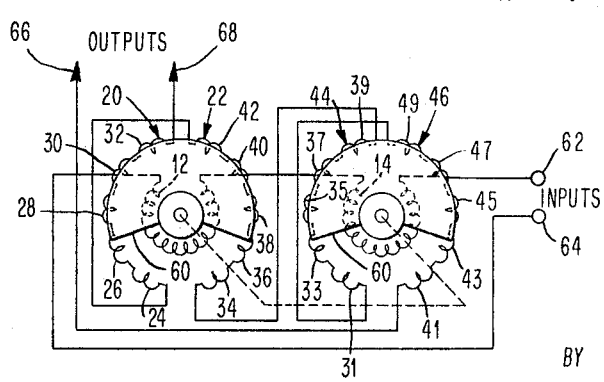
FIGURE 3 is a schematic diagram illustrating the electrical connections of the transformer of FIGURE 1.

Referring to FIGURES 1, 2 and 3, of the drawing, a rotary differential transformer 10 includes a pair of separate primary windings 12 and 14 wound upon a pair of bobbins 16 and 18, respectively.

Associated with the primary winding 12 are two secondary windings 20 and 22. The secondary winding 20 comprises individual coils 24, 26, 28, 30 and 32. The secondary winding 22 comprises individual coils 34, 36, 38, 40 and 42.

Associated with the second winding primary winding 18 are a second pair of secondary windings 44 and 46. The secondary windings 44 and 46 are substantially the same as the secondary windings 20 and 22, and are broken down into a plurality of individual coils. The secondary winding 44 includes a plurality of individual coils 31, 33, 35, 37 and 39 (FIGURE 3) only one of which, i.e. the coil 35 is illustrated in FIGURE 2. Likewise the secondary winding 46 includes a plurality of individual coils 41, 43 45, 47 and 49 (FIGURE 3), only one of which, i.e. the coil 45 is illustrated in FIGURE 2.

A movable element 52 is suitably connected to a shaft 54 and adapted to be fitted into and made movable within the housing 56 on bearings such as bearings 58. A conductive fan or blade like element 60 is suitably attached to the movable element 52. The element 60 may be any suitable metal and provides a magnetic coupling path for the two primary windings to the respective pairs of secondary windings. While only a single element 60 may be employed for coupling the two primary windings to the pair of secondary windings, FIGURE 3 illustrates two elements 60 for purposes of clarity and explanation. A cable 62, including a number of conductors, is used to connect the various electrical input signals to the transformer and to connect the output signals from the transformer to suitable utilization circuits.

The element 60 may of course take a variety of different shapes and forms to provide different degrees of coupling, if desired. Slight modifications in form may, in some cases, be employed to improve the overall linearity of the device.

The shaft 54 may be mechanically connected to various devices for which it is desired to measure angular movements. Angular movement of the shaft 54 causes the angular position of the coupling element 60 to change and thereby vary the magnetic coupling paths between the primary windings and their respective pairs of secondary windings.

Referring to FIGURE 3, an alternating signal may be applied from the input terminals 62 and 64 across the serially connected primary windings 12 and 14 of the rotary differential transformer 10. The current flow through the primary windings 12 and 14 causes voltages to be induced in the pairs of secondary windings 20, 22 and 44, 46, respectively.

The secondary windings 20 and 22 are connected in series opposition or in a bucking relationship with respect to each other, as are the secondary windings 44 and 46. The pairs of the two secondary windings are connected in series adding or in parallel relationship with respect to each other. The basic operation of the present invention will be understood if only a single primary winding and a single pair of secondary windings are considered. The use of two primary windings and two pairs of secondary windings serve to increase the overall sensitivity of the transformer illustrated, as well as providing a certain symmetry which tends to balance out the effects of temperature, vibrations and linear acceleration of directions in which no measurements are to be made.

At a null operating position, the element 60 may be centrally disposed to overlap equally the two secondary windings 20 and 22 as well as the two secondary windings 44 and 46. In this case, equal and opposite voltages induced in the secondary windings results in a net zero voltage at the output terminals 66 and 68, which are connected across one or two pairs of secondary windings.

If, as may be seen, in FIGURE 3, the element 60 is moved counter clockwise, the magnetic coupling path between the primary winding 12 and the secondary winding 20 will increase and the coupling between the primary winding 12 and the secondary winding 22 will decrease. Likewise, a similar movement of the element 60 increases the magnetic coupling between the primary winding 14 and the secondary winding 44, while decreasing the coupling between the windings 14 and 46. As a result of the element 60 being moved in a counter clockwise direction, an output signal voltage indicative of this direction of movement will be developed at output terminals 66 and 68. The amplitude of this voltage indicates the degree of this movement.

In many conventional differential transformers, a certain amount of linearity between the input movement of an element and the corresponding output electrical signal is provided for only a small degree of movement of the element. The reason for this is that the movable element tends to be moved completely into the range of one of the secondary windings and completely out of the range of the other secondary winding. Also, the relative number of turns on the coils being engaged and disengaged are not proportional during the movement of the coupling element, thereby causing non-linearity.

In the present invention, the degree or range of linearity between the input movement of an element and its corresponding output signal is considerably increased by breaking down each of the secondary windings into a plurality of individual coils.

The secondary winding 20, which may comprise the top coils 24, 26, 28, 30 and 32, serially connected to each other, is disposed about the common axis of the rotary transformer 10 with each of the coils being equally distant from the common axis and the primary winding 12 of the transformer. Likewise, the individual coils 34, 36, 38, 40 and 42 comprise the secondary winding 22 and are likewise disposed equally distant from the primary winding 12. The coils of the two secondary windings 20 and 22, in the embodiment of the invention illustrated, extend about the entire circumference of the transformer, although in some cases this need not be the case.

The secondary winding 44 includes coils 31, 33, 35, 37 and 39 and the secondary winding 46 includes coils 41, 43, 45, 47 and 49 (FIGURE 3). The windings 44 and 46 are substantially the same and operate in the same manner as the secondary windings 20 and 22.

The description of the primary winding 12 and its associated secondary windings 20 and 22 is also applicable to the primary winding 14 and its associated secondary windings 44 and 46. Since the operation and structural arrangement in both cases are the same, the description will not be repeated for both situations.

If the element 60 is moved from its null position as a result of movement of the shaft 54, the element will vary the coupling between the primary winding 12 and the two secondary windings 20 and 22 to produce an output signal at the output terminals 66 and 68. However, because each of the secondary windings 20 and 22 comprise a plurality of individual coils, a number of turns of one secondary winding moving out of the coupling range of the element 60 is equal to the number of turns of other secondary winding which moves into the coupling range. This results in an output signal at the terminals 66 and 68, which is substantially linear with respect to the movement of the drive shaft 54, which moves the element 60.

In some cases, the input signal may be applied across the secondary windings with the output signal being taken from the primary winding. The basic operation of the invention will be substantially the same in this case.

It may be seen that, if the secondary windings comprised only a single coil, the element 60 would move out of the coupling range of one secondary winding to a greater extent or ratio than it would move into the coupling range of the other. Hence, with single coil secondaries, only a relatively small degree of linear movement is obtainable.

While the disposition of secondary coils completely around the primary winding will tend to provide a wide degree of linear output signal, in some cases it may be desirable to provide a lesser number of coils extended only part way around the primary winding. In this case, while the provision of more than one coil still provides a greater linear range, the range of linear operation will not be as great as if the coils extended completely around the primary winding.

If a greater number of coils than the number illustrated is used, linearity may be increased further. This would require a large number of coils smaller in size. The particular design considerations, including cost and the degree of accuracy required, will generally determine the actual number of secondary coils used and the degree with which they surround the primary winding.

It is noted that the close coupling of all the elements and the use of highly permeable coupling material in the housing and other elements in the magnetic flux path all serve to enhance the overall sensitivity of the differential transformer 10.

If desired for additional balancing the element 60 may include an integral non-magnetic portion between its two ends instead of an air gap.

The present invention also contemplates the use of secondary coils with each of the coils including a different number of turns in a tapered fashion. Such an arrangement using two secondary windings arranged in a tapered complementary fashion is shown and described in Patent No. 3,054,976, issued on September 18, 1962, entitled Differential Transformer and assigned to the same assignee as the present invention. The use of the principles described in the aforementioned patent makes it possible to provide a still greater angular linear range of the operation when combined with the rotary transformer of the present invention.

As mentioned, the element 60 may be the coupling element for two differential transformers. Any movement of the element 60 parallel to the axis of the transformer will tend to produce cancelling voltage signals in the secondary windings of the transformer. Hence, measurement signals will be produced only when the element 60 is moved in the direction over which it is desired to make a measurement, which involves rotation of the shaft 54.

Various modifications may of course be made in the structure illustrated without departing from the scope of the present invention. Such modifications would be obvious to those skilled in the field of differential transformers.

While the embodiment illustrated shows a symmetrical arrangement wherein all the secondary coils are substantially the same, it is apparent that this is not absolutely necessary. For example, in some cases, it may be desirable to include an arrangement involving different types of secondary coils, to shift the null operating point. Such an arrangement involves a differential transformer wherein the null operating point is shifted so that it is not in the center of the range of linear movement of the core.

In some cases, the secondary coils may be unsymmetrical so that the linear output signal may be obtained through a greater angle in one direction of core movement than in the other. The secondary coils may also be made unsymmetrical so that the maximum total linear angular movement may be divided unequally.

While the secondary coils have been described as being parallel to the primary coil or common axis of the transformer, axially angular variations may be provided to improve linearity or other characteristics.

While the embodiment illustrated offers many advantages for manufacturing and assembly, it should be realized that the invention contemplates positions and arrangements not illustrated. While the secondary coils have been illustrated with their axes parallel to the axis of the primary winding, actually these axes of the secondary coils could be at right angles to the axis of the primary winding. They could also be disposed at any angle dependent upon the particular type of design involved.

What is claimed is:

1. A rotary differential transformer comprising a primary winding disposed about a common axis, a pair of secondary windings connected in bucking relationship with respect to each other, each of said secondary windings including a plurality of coils each having an axis substantially parallel to said common axis, and a movable element providing magnetic coupling between said primary and secondary windings to produce an output signal corresponding to the movement of said movable element.

2. A rotary differential transformer comprising a primary winding wound about a common axis, a pair of substantially similar secondary windings connected in bucking relationship with respect to each other, each of said secondary windings including a plurality of serially connected coils each having an axis equally spaced from and parallel to said common axis, said coils being equally spaced from said common axis extending about said axis, a coupling conductive element disposed to provide a magnetic coupling path between said primary and secondary windings, said coupling element being adapted to be moved to vary the relative coupling between said pair of secondary windings, said coupling element being movable equally into the range of one of said secondary windings and out of the range of the other secondary winding, and means for applying an electrical signal to said primary winding to induce an output signal across said secondary windings corresponding to the degree of movement of said coupling element.

3. A transformer comprising two primary windings, two pairs of substantially similar secondary windings with the windings in each pair being connected in bucking relationship with respect to each other, each of said secondary windings including a plurality of serially connected coils, said coils being equally spaced from each other and extending about an axis substantially 360 degrees, with the coils of each secondary winding extending about said axis substantially 180 degrees, a common coupling conductive element disposed to provide a magnetic coupling path between said two primary windings and said two pairs of secondary windings, said common coupling element being adapted to be moved to vary the relative coupling between said two primary windings and said pairs of secondary windings, said common coupling element being movable equally into the range of one of said secondary winding of each of said pairs of secondary windings and out of the range of the other secondary winding of each of said pairs of secondary windings, and means for applying an electrical signal to said two primary windings to induce an output signal across said secondary windings corresponding to the degree of movement of said common coupling element.

References Cited by the Examiner

UNITED STATES PATENTS 2,490,655 12/1949 Schoeppel _____ 336—135
3,112,474 11/1963 Chen et al. _____ 336—131 X LEWIS H. MYERS, *Primary Examiner.*

JOHN F. BURNS, LARAMIE E. ASKIN, *Examiners.*

C. TORRES, *Assistant Examiner.*